US008274364B1

(12) United States Patent
Bohen et al.

(10) Patent No.: US 8,274,364 B1

(45) Date of Patent: Sep. 25, 2012

(54) SELECTABLE ACCESS TO COMPARTMENTS IN A CASH HANDLING DEVICE

(75) Inventors: Daniel Christopher Bohen, Charlotte, NC (US); Amy Baker Folk, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 794 days.

(21) Appl. No.: 12/183,910

(22) Filed: Jul. 31, 2008

(51) Int. Cl.

| | |
|---|---|
| ***G05B 19/00*** | (2006.01) |
| ***G06Q 40/00*** | (2006.01) |
| ***G06F 7/00*** | (2006.01) |
| ***G06F 17/00*** | (2006.01) |
| ***G06F 7/10*** | (2006.01) |
| ***B07C 5/00*** | (2006.01) |

(52) U.S. Cl. ......... 340/5.41; 705/43; 700/214; 235/375; 209/534

(58) Field of Classification Search ........................ None
See application file for complete search history.

(56) References Cited

U.S. PATENT DOCUMENTS

| | | | | |
|---|---|---|---|---|
| 6,378,770 | B1 | 4/2002 | Clark et al. | |
| 6,540,136 | B1 | 4/2003 | Ross | |
| 6,601,687 | B1 * | 8/2003 | Jenrick et al. | 194/206 |
| 7,232,024 | B2 * | 6/2007 | Mazur et al. | 209/534 |
| 7,293,699 | B2 * | 11/2007 | Jenkins et al. | 235/379 |
| 2003/0041028 | A1 * | 2/2003 | Blackson et al. | 705/43 |
| 2004/0016796 | A1 * | 1/2004 | Hanna et al. | 235/375 |
| 2004/0083176 | A1 * | 4/2004 | Utz et al. | 705/43 |
| 2004/0154964 | A1 * | 8/2004 | Jones | 209/534 |
| 2008/0082454 | A1 * | 4/2008 | Dilip et al. | 705/76 |
| 2008/0201213 | A1 * | 8/2008 | Lee et al. | 705/14 |
| 2009/0166269 | A1 * | 7/2009 | Tanaka et al. | 209/534 |
| 2009/0192938 | A1 * | 7/2009 | Amos | 705/43 |
| 2010/0168903 | A1 * | 7/2010 | Aas et al. | 700/214 |

* cited by examiner

*Primary Examiner* — George Bugg

*Assistant Examiner* — Renee Dorsey

(74) *Attorney, Agent, or Firm* — Banner & Witcoff, Ltd.; Michael A. Springs

(57) ABSTRACT

Methods and devices provide flexible demarcation points in order to determine whether access to individual stackers, rollers or areas in a cash handling device should be allowed. A plurality of stackers may be provided in a cash handling device and may store different denominations of currency. An input means may receive user input to request access to one or more of the stackers. One or more variables stored in memory may indicate whether user access is authorized for a given stacker. One or more electromechanical locks may secure one or more of the stackers. Computer-executable instructions executing on a processor may access the variable(s) in order to determine whether to allow user access to a requested stacker and may unlock the lock if access is authorized.

19 Claims, 7 Drawing Sheets

SELECTABLE ACCESS TO COMPARTMENTS IN A CASH HANDLING DEVICE

BACKGROUND

Cash handling devices (e.g., cash recyclers) typically contain one or more compartments. One or more of these compartments may contain a plurality of stackers or rollers) that hold currency. For example, one stacker may hold "one dollar" bills; another may hold "five dollar" bills; still another may hold "twenty dollar" bills; yet another may hold "fifty dollar" bills; and a further may hold "one hundred dollar" bills.

If a bank secures each compartment that holds the stackers, then the retailer or entity in which the cash recycling device is located may not have access to the stackers. This may be beneficial in order to prevent theft; however, it is problematic from a service perspective. This is because if a problem arises (e.g., a jam occurs in a stacker or in a paper handling path), then the retailer or entity cannot fix the problem itself. Instead, a service call must be made to the bank. The bank may then have to dispatch an authorized service person to fix the problem in the cash handling device.

Alternatively, if the bank does not secure the compartments that hold the stackers or rollers, anyone passing by the cash handling device could open it and steal the currency contained therein. Thus, there is no currently available system that provides a balance between the interests of safety and service for cash handling devices.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In accordance with various embodiments of the present invention, methods and devices can provide flexible demarcation points in a cash handling device. For example, methods and devices can provide selectable access to compartments in a cash handling device.

In one embodiment, an apparatus includes a plurality of stackers or rollers for storing currency. A processor executes computer-executable instructions and memory stores the computer computer-executable instructions. The computer-executable instructions may cause the apparatus to determine whether to allow user access to one or more of the plurality of stackers storing the currency.

In another embodiment, different denominations may be stored on different stackers.

In yet another embodiment, the computer-executable instructions may allow user access to one of the stackers and prevent access to another of the stackers.

In still another embodiment, the computer-executable instructions may allow user access to one of the stackers that contains a first denomination of currency and prevent access to stackers that contain denomination(s) of currency that are greater than the first denomination.

In a further embodiment, the memory may contain one or more variables that indicate whether user access is authorized for one or more stackers.

In still a further embodiment, the memory may contain one or more variables that indicate whether user access is authorized for one or more stackers, and the variable(s) may be modified locally.

In yet a further embodiment, the memory may contain one or more variables that indicate whether user access is authorized for one or more stackers, and the variable(s) may be modified remotely.

In another embodiment, at least three stackers containing different denominations of currency may be provided. At least one authorization may be stored in memory. Access to each stacker may be allowed selectively depending on the appropriate authorization in memory.

In a further embodiment, at least one electromechanical lock may be used to secure the stackers.

In another embodiment, a separate electromechanical lock may be used to secure each separate stacker.

In another embodiment, the apparatus may be a cash handling device.

In still another embodiment, the cash handling device may be a cash recycler.

In another embodiment, an input means and display may include a touch sensitive screen.

In yet another embodiment, the input means may include a touch-sensitive screen.

In still another embodiment, the display may include a touch sensitive screen.

In other embodiments, the input means may include a keypad or keyboard.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for providing flexible demarcation points in a cash handling device.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
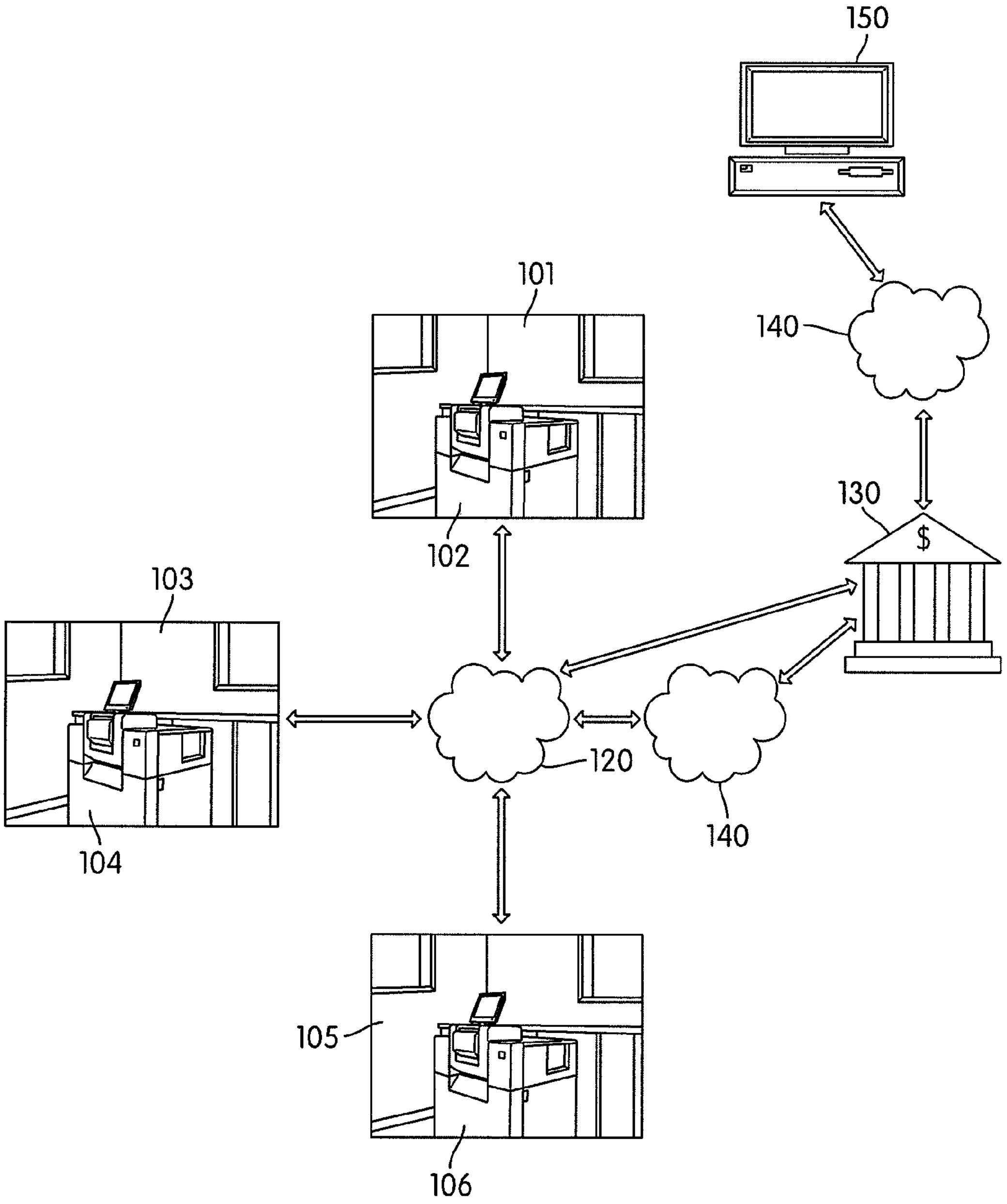
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
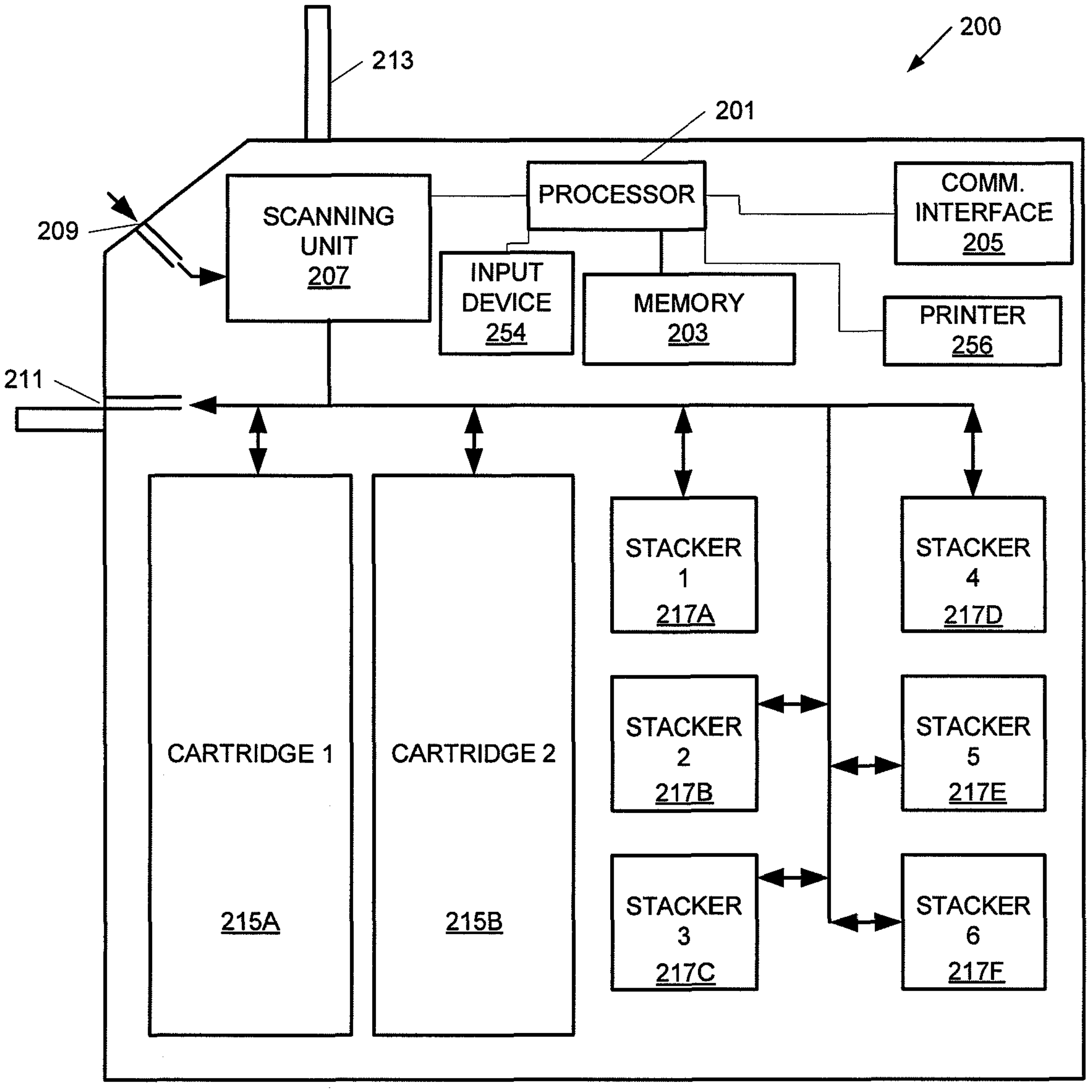
FIG. 2 illustrates a simplified diagram of a cash handling device in accordance with an aspect of the invention.

In FIG. 2, cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Cartridge 215 may also be for denominations that do not need to be recycled. They can be sent to the cartridge to provide for more capacity for those denominations that do need to be recycled. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be an invalid reproduction. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
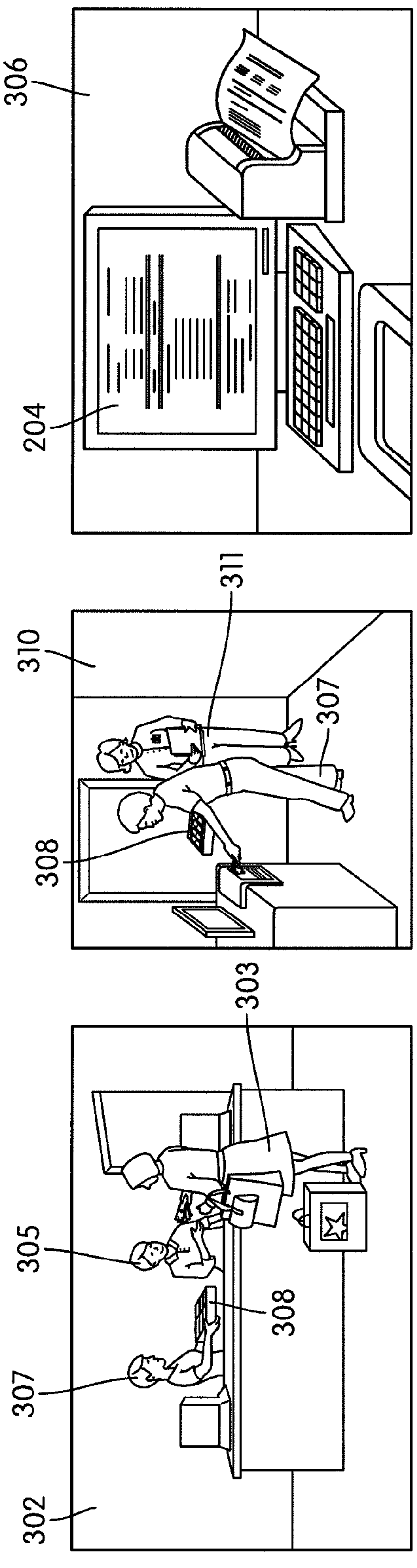
FIG. 3 illustrates various features of a cash handling device that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show in the displayed information 204 the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
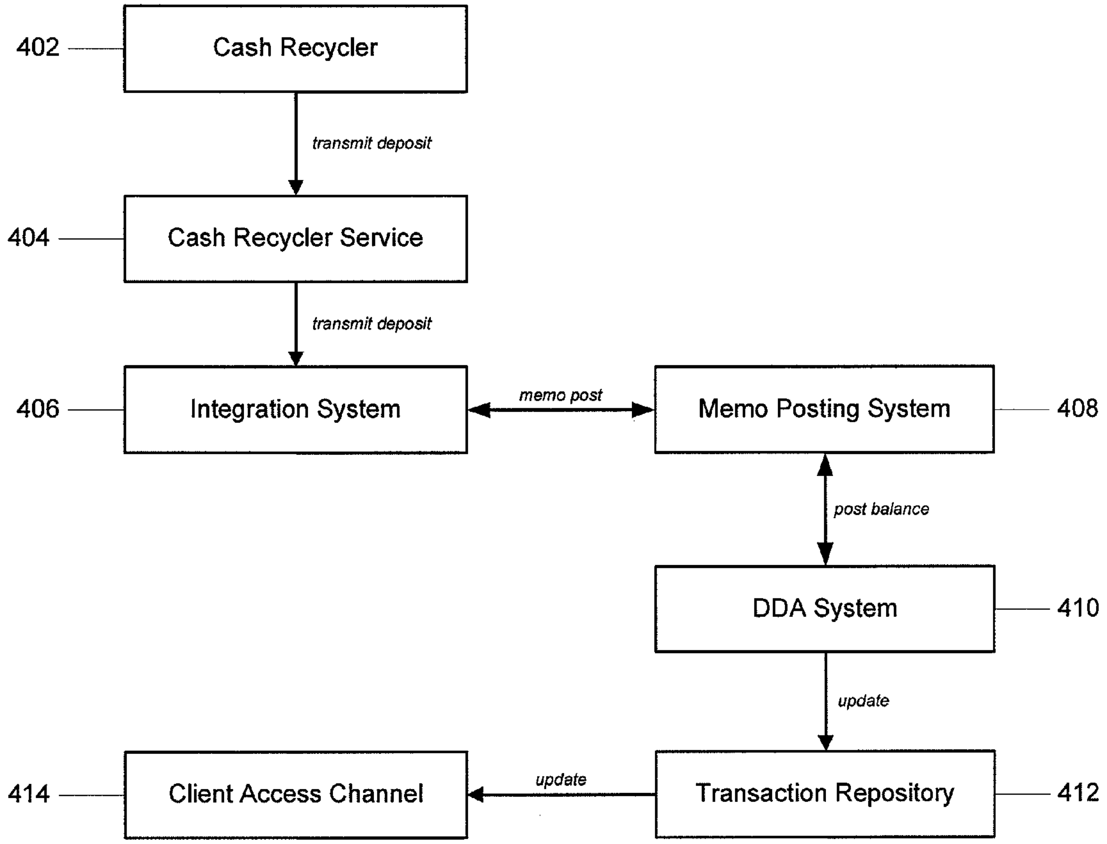
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
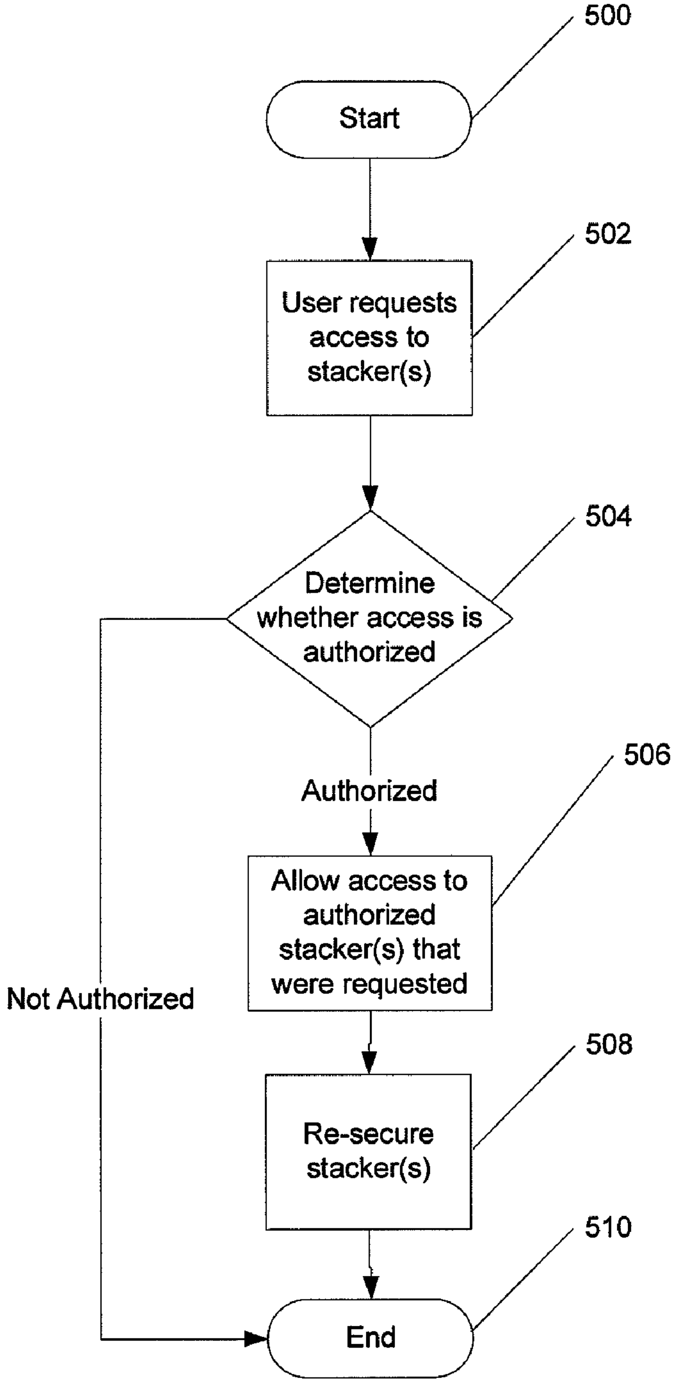
FIG. 5 illustrates an example of method of provide flexible demarcation points in order to determine whether access to individual stackers in a cash handling device should be allowed.

FIG. 5 illustrates an example of a method of providing flexible demarcation points in order to determine whether access to individual stackers or groups of stackers in a cash handling device should be allowed. Upon start 500, a cash handling device (e.g., cash recycler, etc.) 102, 104, 106 may receive an input from a user 307.

The inventions of this application may also be used in conjunction with the teachings of the inventors' commonly-owned and concurrently-filed patent application entitled "Selectable Recognition of Currency Deposited into a Cash Handling Device," which bears Ser. No. 12/183,888, and which is incorporated in its entirety by reference. In particular, that application provides a disclosure of flexible demarcation points in order to selectably recognize currency deposited in a cash handling device. That application explains that a denomination threshold may be set and a deposit may be requested. Currency may be deposited and scanned in order to determine its denomination. The currency may be routed a stacker corresponding to the currency's denomination. If the denomination of the currency is less than or equal to the denomination threshold, then the deposit may be credited to an account. Otherwise, crediting of the account may be delayed until the currency can be verified as, for example, not an invalid reproduction. Information about the deposit may be communicated to a bank.

This input may allow a user to make a request 502 to access one or more stackers 217A-217F. The input may be received from a keypad, keyboard, pressing an applicable portion or button of a touch-sensitive display, a barcode scanner, magnetic card reader, use of a proximity card, or the like.

After an input is received 502 indicating that a user would like access to one or more stackers, the cash handling device may determine whether such access is permitted for the requested stacker(s) 504. Persons of skill in the art will understand that this may be determined in a variety of ways. One example is to have one or more variables stored in memory 203 that determine authorizations and access to stacker(s). In one embodiment, an authorization variable could be used to indicate that a certain user can have access to denominations less than a certain threshold amount. For example, one user might have access to stackers containing denominations less than or equal to $20. Conversely, the user might not have access to stackers containing denominations greater than $20. Different users may have different authorizations and thus be able to access different stackers or portions of the cash recycler system. In another embodiment, a separate variable may be used to store an authorization permission or denial for a separate stacker. In other words, each stacker may have its own variable in memory. Further, in various embodiments, these variables may be changed locally or remotely as desired by the bank.

Figure 6:
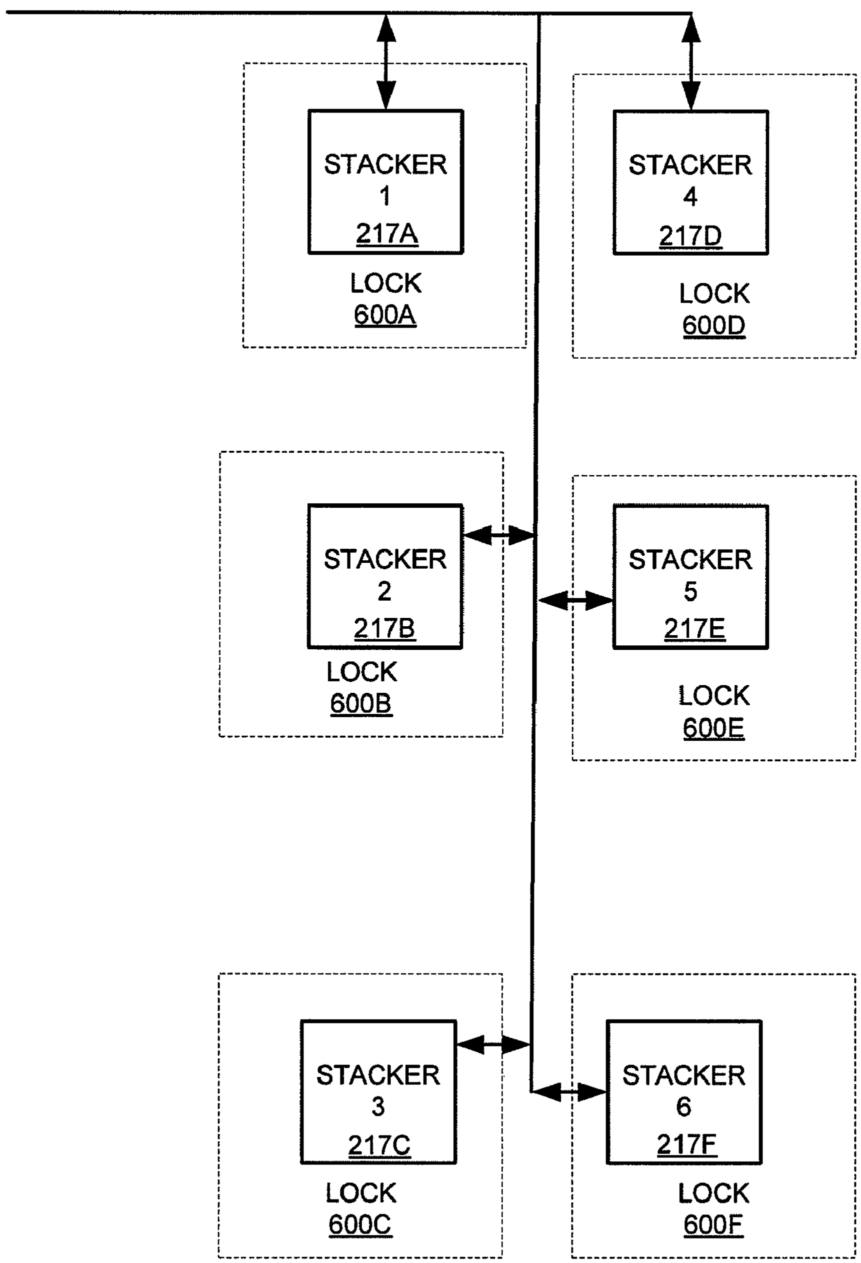
FIG. 6 is an enlarged view of the simplified cash handling device depicted in FIG. 2 and illustrates an example of each stacker having its own separate electromechanical lock.
Figure 7:
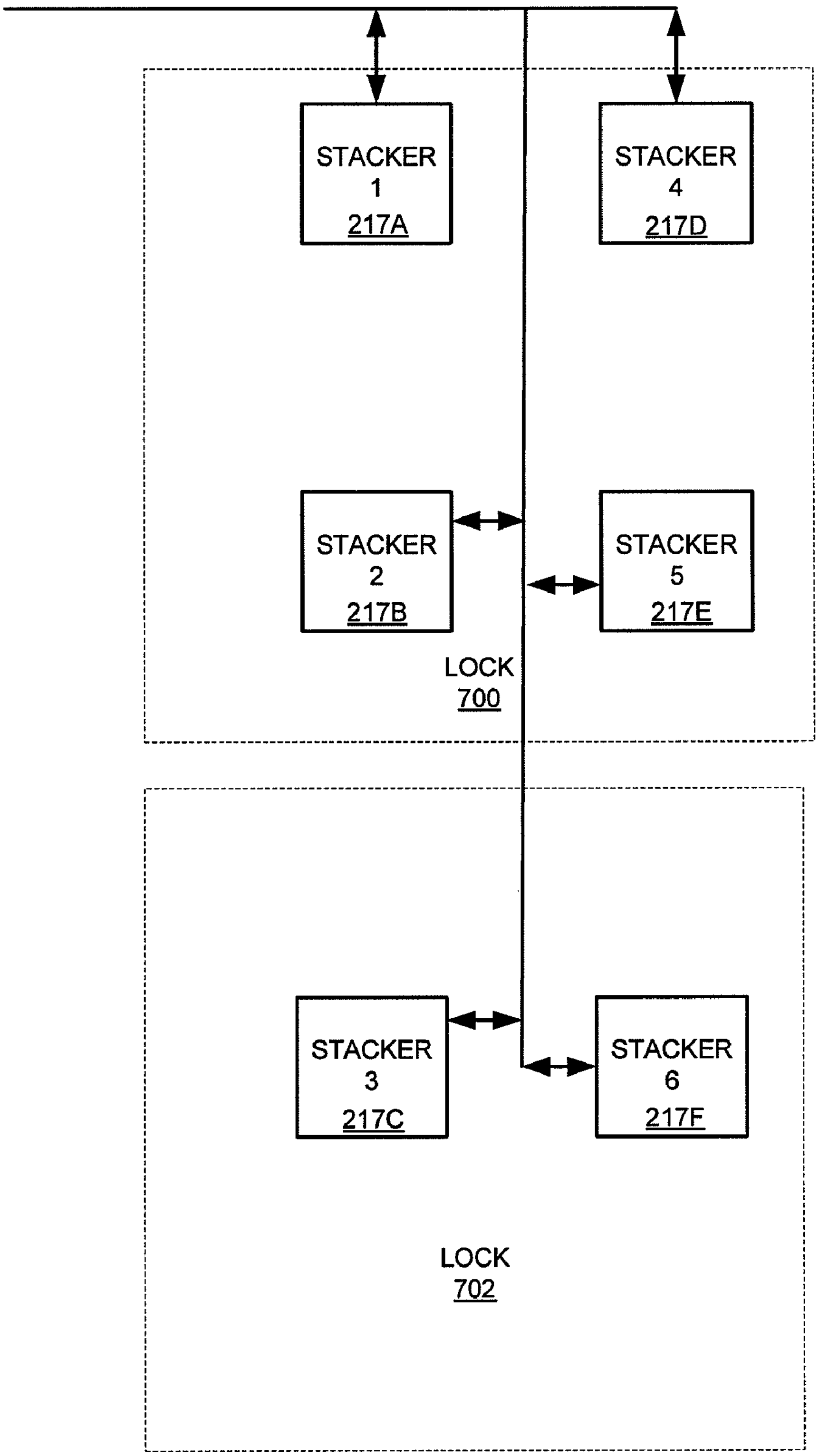
FIG. 7 is an enlarged view of the simplified cash handling device depicted in FIG. 2 and illustrates an example of multiple stackers being secured with a single electromechanical lock, depending on the size of the denomination contained in the stacker.

After a determination regarding authorization is made 504, access is provided 506 if the user is authorized access to the stacker(s) that were requested. Again, persons of skill in the art will understand that this may be accomplished in a variety of ways. One example is to provide one or more electromechanical locks 600A-600F, 700, 702 in order secure one or more of the stackers 217A-217F. For example, each stacker may have a separate lock to secure it. This is shown in FIG. 6. Alternatively, multiple locks may be used. An example of this would be if one lock secures stackers containing lower denominations of currency and a different lock secures stackers containing larger denominations of currency. The processor 201 could then selectively unlock the lock(s) corresponding to the stackers 217A-217F for which authorization exists and for which user request was made. This is shown in FIG. 7. Stackers may then be re-locked or re-secured 508. The process may then end 510.

If a determination is made regarding authorization and the user is not authorized to access the requested stacker(s), the process may then terminate 510. Alternatively, one or more notifications of the failed access attempt may also be provided.

Further, configuration of the access demarcation points may be reconfigured. Thus, if a recycler is moved from one business to another business or if employee status changes (e.g., promotion of an employee that gives them more access rights), the access demarcation points may be changed based on various factors. This allows a financial institution to reuse cash handling devices and eliminates the need to physically replace locks or doors based on which stackers, rollers or general areas of the cash handling device are or are authorized for access.

While cash handling device access has been described in large part with respect to stackers and rollers, the same or similar access features may be used for controlling access to areas of the cash handling device. For example, access to an area of the cash handling device containing scanning mechanisms may be controlled independently of a remainder of the cash handling device.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

The invention claimed is:

1. An apparatus comprising:

a plurality of stackers for storing currency, the plurality of stackers including a first stacker storing currency and a second stacker storing currency;

at least one processor; and memory operatively coupled to the at least one processor and storing computer-readable instructions that, when executed, cause the apparatus to:

determine whether to allow user access to the first stacker of the plurality of stackers and the second stacker of the plurality of stackers;

responsive to determining to allow user access to the first stacker and not allow access to the second stacker, allowing physical access to the first stacker and all the currency stored in the first stacker and preventing physical access to the second stacker and all the currency stored in the second stacker.

2. The apparatus of claim 1 wherein the first stacker stores a first denomination of said currency and the second stacker stores a second denomination of currency different from the first denomination of currency.

3. The apparatus of claim 2 wherein the first denomination of the currency stored in the first stacker is less than the second denomination of the currency stored in the second stacker.

4. The apparatus of claim 3 further comprising an input means for receiving user input to request access to the first stacker and the second stacker.

5. The apparatus of claim 4 further comprising a display for displaying messages in accordance with the computer-executable instructions.

6. The apparatus of claim 5 wherein the display is a touch-sensitive screen.

7. The apparatus of claim 5 wherein the memory stores at least one variable that determines whether said user access is authorized for the first stacker and the second stacker.

8. The apparatus of claim 5 wherein the memory stores a separate variable for each said stacker in order to denote whether said user access is authorized for each said stacker.

9. The apparatus of claim 7 further comprising a communication interface that allows said at least one variable to be modified remotely.

10. The apparatus of claim 7 further comprising a communication interface that allows said at least one variable to be modified locally.

11. The apparatus of claim 7 wherein said at least one variable may be modified through the input means.

12. The apparatus of claim 10 wherein the at least one processor, the memory, the display, the input means, and the plurality of stackers are included within a cash handling device.

13. The apparatus of claim 12 wherein the cash handling device is a cash recycler.

14. The apparatus of claim 12 further comprising at least one electromechanical lock that secures said plurality of stackers.

15. A method comprising:

providing at least three stackers containing different denominations of currency, the at least three stackers being located within a cash handling device;

storing at least one authorization in a memory;

selectively allowing physical access to each of said at least three stackers and all the currency in each of said at least three stackers depending on said at least one authorization in said memory.

16. The method of claim 15 further comprising the step of allowing said at least one authorization in the memory to be changed locally.

17. The method of claim 15 further comprising the step of allowing said at least one authorization in the memory to be changed remotely.

18. The method of claim 15 wherein said storing step and said selectively allowing step are implemented as computer-executable instructions stored on a computer-readable medium.

19. A cash recycler comprising:

at least one processor;

memory operatively coupled to the at least one processor and storing computer-readable instructions;

at least three stackers for storing currency, each said stacker storing currency of a different denomination;

an input means for receiving user input to request access to one or more of said stackers;

at least one variable stored in memory that indicates whether said user access is authorized for each said stacker;

a display for displaying messages in accordance with the computer-executable instructions; and at least one electromechanical lock securing at least one of said at least three stackers, wherein the computer-readable instructions, when executed, cause the processor to:

access said at least one variable in order to determine whether to allow said user physical access to each of said plurality of stackers and all the currency in each of said plurality of stackers storing said currency and unlock said at least one electromechanical lock if said user access is authorized.

* * * * *